Figure 3:
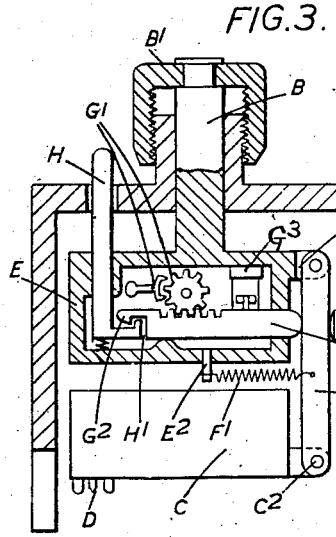

March 27, 1945. R. E. REASON 2,372,451
APPARATUS FOR MEASURING OR INDICATING THE
ROUGHNESSES OR UNDULATIONS OF SURFACES
Filed July 15, 1943 2 Sheets-Sheet 1
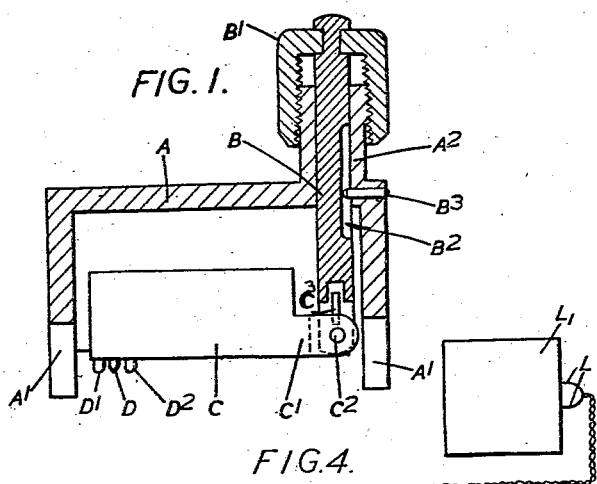
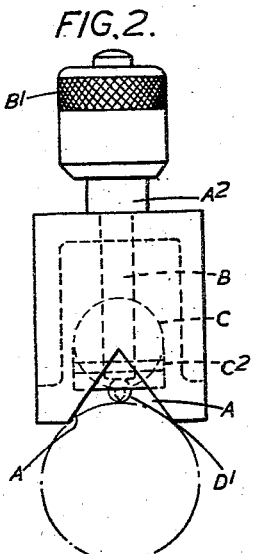
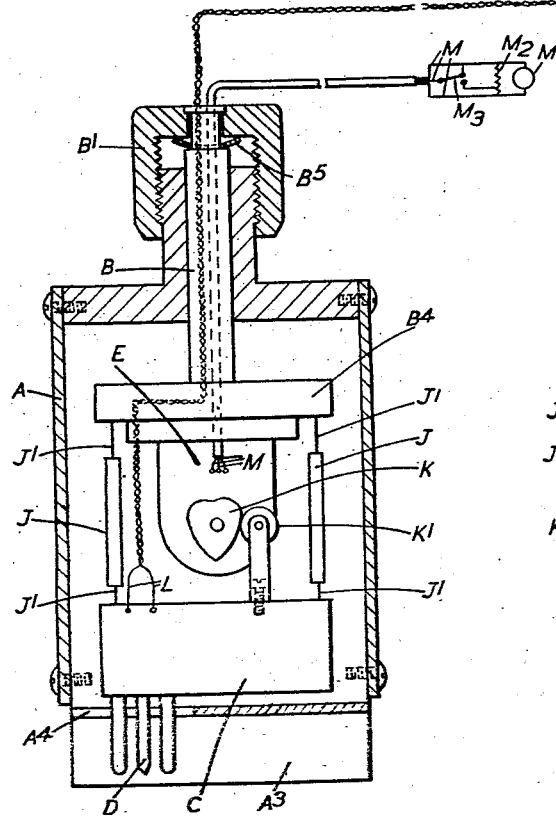
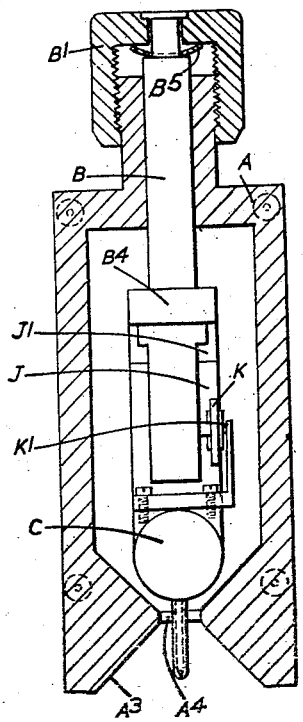
Inventor
R E Reason
By
Attorneys March 27, 1945.   R. E. REASON   2,372,451
APPARATUS FOR MEASURING OR INDICATING THE
ROUGHNESSES OR UNDULATIONS OF SURFACES
Filed July 15, 1943   2 Sheets-Sheet 2

Inventor
R. E. REASON
By
Attorney

Patented Mar. 27, 1945

2,372,451

UNITED STATES PATENT OFFICE 2,372,451

APPARATUS FOR MEASURING OR INDICATING THE ROUGHNESSES OR UNDULATIONS OF SURFACES

Richard Edmund Reason, Leicester, England, assignor to Taylor, Taylor & Hobson Limited, Leicester, England, a company of Great Britain Application July 15, 1943, Serial No. 494,873
In Great Britain May 18, 1942

15 Claims. (Cl. 73—105)

This invention relates to apparatus for measuring or indicating the roughnesses or undulations of a surface, of the kind in which a stylus is traversed over the surface and controls a measuring device in accordance with its movements normal or approximately normal to the surface during such traversing.

In the specifications of U. S. A. patent aplications Serial Nos. 381,920 (filed March 5, 1941), 378,836 (filed February 13, 1941), and 379,536 (filed February 18, 1941), apparatus of this kind is described wherein a pick-up unit incorporating the stylus is carried on an arm projecting from a casing which is adjustably mounted on a stand and contains mechanism for driving the arm (and thus traversing the stylus over the surface) at any one of a plurality of different speeds, such unit being employed in conjunction with a pen recorder for giving a trace of a section of the surface and with an integrating meter for giving a measure of the "average" roughness of a portion of the surface, a relatively slow speed of traverse being utilised for operating the pen recorder and a relatively fast speed for operating the "average" meter.

The present invention has for its primary object to provide a simplified form of apparatus incorporating a portable pick-up unit which can be brought by hand into engagement with the surface and is connected to the rest of the apparatus merely by a flexible electric lead, the unit being more especially intended for use on cylindrical surfaces although also capable of use in other surfaces. For many purposes it will suffice to provide an "average" measurement alone, the pen recorder being omitted or alternatively to employ only a pen-recorder without an "average" meter, and the invention readily lends itself to such simple cases as well as to more elaborate instances in which both kinds of measurement are required.

With such a simplified unit it is necessary to provide adequate protection from damage for the stylus and for the detector device which transforms the stylus movements into electrical energy, and to prevent errors from arising as the result of irregular hand pressure on the unit. In particular, it is desirable to provide one or more skids on the unit which can run over the surface or an auxiliary surface and afford a datum or "zero" for the stylus movements normal to the surface. If such skids are located close to the stylus, serious errors in measurement can readily arise from failure to steer the unit properly along the surface, whilst on the other hand if such skids are relatively widely spaced to avoid risk of such errors, other errors may arise since without careful adjustment the skids may not locate the stylus within its operative range of movement.

These difficulties are obviated in the construction of a pick-up unit according to the present invention, which comprises a pick-up head provided with a stylus for engaging the cylindrical or other test surface and with means affording a datum for the stylus movements, a light supporting framework therefore having relatively widely spaced supporting elements which are held in engagement with the test surface, and means for adjusting the pick-up head relatively to the supporting elements of the framework in a direction approximately normal to the test surface, the supporting element being so arranged that, when the apparatus is applied to the investigation of a cylindrical surface, measuring movements of the stylus in all positions of adjustment of the pick-up head are constrained to take place along a line which intersects the axis of the cylindrical surface or passes close thereto.

The datum for the stylus movement may be provided by means of one or more skids mounted on the pick-up head close to the stylus and engaging with the test surface. Alternatively the invention of the present applicant's copending U. S. A. patent application Serial No. 458,560 (filed September 16, 1942) may be incorporated into the unit. Thus the datum for the stylus movements may be provided by means of a guiding device having two relatively movable elements, one of which is carried by the pick-up head whilst the other remains stationary during traversing of the stylus over the test surface, one of such elements being constituted by a reference surface set so that a line on it is maintained substantially parallel to the test surface in the direction of traversing, whilst the other is constituted by a skid cooperating with the reference surface along such line.

The arrangement of the supporting elements of the framework may vary to suit the type of test surface on which it is to rest. Thus for a framework suitable for use on either plane or cylindrical surfaces, the supporting elements may conveniently be so shaped as to engage with the test surface at points lying on two parallel lines. For example the supporting elements may consist of or constitute a V-groove or parts of a discontinuous V-groove, for use with a convex cylindrical surface, or may consist of a pair of parallel rails or of parts of a pair of discontinuous parallel rails for use more especially with a concave cylindrical surface.

The mounting of the pick-up head in the framework should preferably be such as to permit a limited amount of play in any position of adjustment. Thus the head may be resiliently supported on a member adjustable in the framework or alternatively may be pivoted to such member at a point remote from the stylus.

The whole unit may be traversed by hand over the surface, or alternatively means may be provided whereby the pick-up head can be traversed over a limited range relatively to the framework. In such base, driving mechanism for traversing the pick-up head may be mounted in a casing carried by the adjustable member supporting the head. The traversing movement may be controlled by escapement or other timing mechanism within the casing. In such case, it will usually be convenient to provide ratchet or equivalent means in the timing mechanism or in its connection to the pick-up head to permit quick resetting of the head to its starting position after a traverse in one direction.

The detector device within the head, responsive to movements of the stylus approximately normal to the test surface and electrically controlling the measuring or indicating device in accordance with such movements, may take various forms, and may consist of an electromagnetic device similar to that described in the abovementioned specification or of a piezo-electric crystal.

Figure 6:
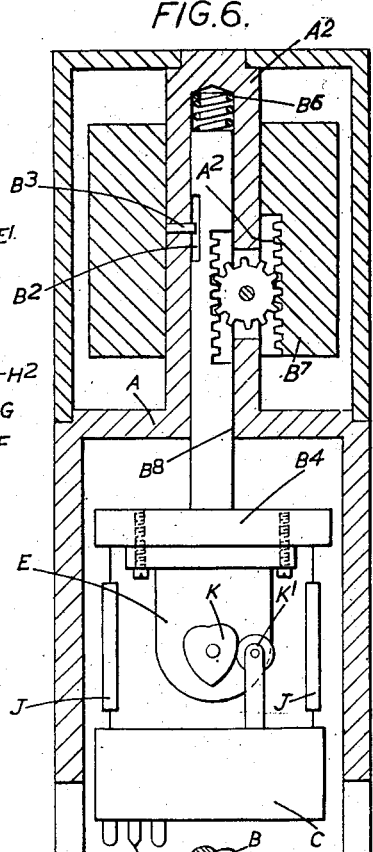
Figure 7:
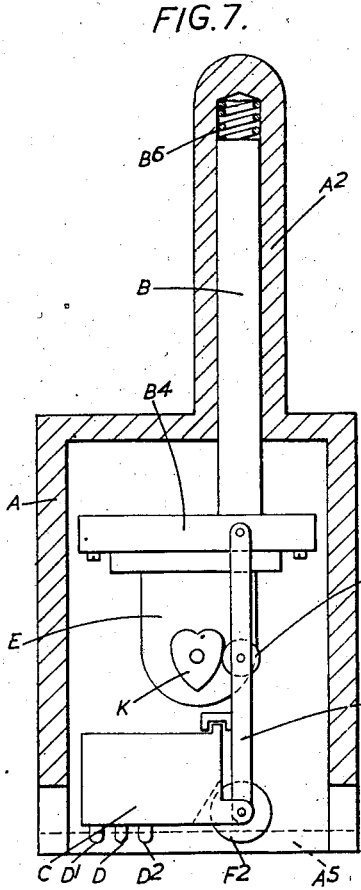
Figure 8:
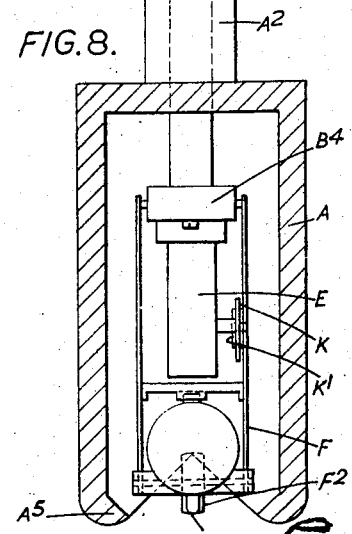

The invention may be carried into practice in various ways, but some convenient practical arrangements according thereto are illustrated by way of example in the accompanying drawings, in which Figures 1 and 2 are respectively a longitudinal sectional view and an end view of one simple construction intended for hand traversing, Figure 3 shows in longitudinal sections modification of Figures 1 and 2 incorporating a traversing drive, Figures 4 and 5 are views similar to Figures 1 and 2 of an alternative construction, Figure 6 illustrates a further variant in longitudinal section, and Figures 7 and 8 show yet another alternative construction.

In the arrangement of Figures 1 and 2 the framework consists of a rectangular box-like member A, comprising an upper wall, two side walls and two end walls and open on its lower side. Each end wall has a deep V-groove $A^1$ cut in its lower edge, its bottom corners on both sides of the V extending well beneath the lower edges of the side walls. It will be at once clear that this shape affords a satisfactory firm basis not only for resting on a plane surface but also for resting on a cylindrical surface of any radius (within a limited range).

The upper wall is provided at one end with an upstanding boss $A^2$ within which a vertical rod B can slide. A loose collar $B^1$ near the top of this rod has an internally threaded cylindrical flange screwing on to the boss $A^2$, so that by screwing or unscrewing this nut $B^1$ on the boss the rod will be lowered or raised in the framework. The rod B is provided with a keyway $B^2$ in which a key $B^3$ in the framework engages to prevent it from rotating about its axis.

The pick-up head C is provided with a lug $C^1$ at one end pivoted at $C^2$ to the lower end of this rod B the lug carrying a pin $C^3$ engaging in a slot in the rod so as to afford stops limiting the pivotal movement to a small angular movement. The pivot $C^2$ lies close to one of the end walls of the framework A and the head C extends very nearly to the other end wall. Near such further end, the head has a small hole in its lower surface through which the sharp-pointed stylus D projects. Two skids $D^1D^2$ are provided, one on either side of the stylus D, in line with the length of the head C, (though only one of the two skids will be operative at any one time), the other then serving as a guard. The stylus is connected through a suitable lever and spring mechanism (not shown) to a piezo-electric crystal within the head, and electrical leads connected to a cable leading to a measuring unit are connected up in the usual way to the crystal, so as to carry current dependent on the pressure exerted on the crystal by the stylus D. Such an arrangement can be made highly sensitive to the minute movements of the stylus resulting form roughness of the surface.

In use, the framework A is placed on the surface and the vertical rod B is adjusted to bring the head C into the position in which the skids $D^1$ and $D^2$ just rest on the surface. The whole units is then slowly traversed by hand over the surface and the necessary measurement is made by the average meter, which is energised in the manner similar to that described in the specifications above mentioned in accordance with the current received from the piezo-electric crystal, and therefore in accordance with the stylus movements normal to the surface dependent on the roughness of the surface.

It will be appreciated that, nothwithstanding the fact that the whole unit is loose on the end on a flexible electric cord or cable, the stylus and crystal are well protected from damage, and moreover the hand pressure is wholly taken by the relatively robust framework, and owing to the small free movement about the pivot $C^2$, cannot harmfully affect the measurements which are accurately obtained relatively to the datum afforded by the skids $D^1D^2$ close to the stylus.

It will often be convenient to incorporate a traversing drive within the unit, the framework being held stationary by hand on the surface. This can readily be achieved by increasing the height of the framework sufficiently to accommodate a small casing containing the driving mechanism.

Thus in this modification, shown in Figure 3, the adjustable vertical rod B is placed centrally in the top wall of the framework A and is rigidly connected at its lower end to the casing E. At one end of the casing E a projecting lug $E^1$ affords a pivot for a lever F which extends downwardly and is pivoted at its lower end at $C^2$ to the pick-up head C, the arrangement of such lower pivot $C^2$ and of the head C being similar to that of Figures 1 and 2. The lever F is connected by a light tension spring $F^1$ to a stud $E^2$ on the casing E and a driving rod G projects through the end wall of the casing E to abut against the lever F and thereby to drive it through a short distance against the light spring $F^1$.

Within the casing E the driving rod G is actuated by a main spring under the control of escapement mechanism, diagrammatically indicated at $G^1$. Such mechanism may be similar to one or other of the timing mechanisms, commonly employed for the operation of the camera shutters. At its rear end, the driving rod G has a detent $G^2$ engaged by a catch $H^1$ operated by a press-button H outside the framework A, so that operation of the press button H releases the catch H¹, G² and allows the traversing drive to take place.

A ratchet or equivalent device is incorporated in the drive from the escapement mechanism to the lever F, so that the driving rod G can be reset to its starting position quickly without retardation from its escapement mechanism. This resetting movement is controlled by a second press-button H² outside the framework, for example one acting directly on the lever F through the end wall of the framework A.

When this arrangement is employed for obtaining an "average" measurement, the electrical circuit controlling the average meter includes limit contacts G³ in the casing E directly operated by the movement of the driving rod G, so that the average meter is energised for an accurately predetermined time. A very short traversing movement is amply sufficient to obtain the desired average measurement, and only quite small clearances are required for the pick-up head movement within the length of the framework A. The provision of a traversing drive within the casing makes it possible to obtain a satisfactory graph on a pen-recorder, provided that the casing is held stationary throughout the movement.

If desired, instead of providing skids on the lower side of the pick-up head to run on the test surface itself, the pick-up head may carry a skid running on an optically flat reference surface carried by the stationary framework or otherwise held stationary in such a position as to lie accurately parallel to the test surface in the direction of traversing. Alternatively, such reference surface may be carried by the pick-up head for engagement by a stationary skid. Other modifications analogous to those described in the specification of copending application Serial No. 458,560 above mentioned can alternatively be employed.

The shape of the framework A may be modified in a variety of ways. Thus instead of having a pair of V-grooves in its end walls, the framework may rest on a continuous V-groove extending throughout its length as shown at A³ in Figures 4 and 5 with a slit A⁴ along the ridge of the V, through which the stylus D can project. Again instead of or in addition to using a continuous or discontinuous V-groove, a pair of parallel rails A⁵ as shown in Figures 7 and 8 (either continuous or discontinuous) may be employed, this modification being suitable for concave or convex cylindrical surfaces.

The mounting of the pick-up head C adjustably in the framework A may also be modified, for example by employing a ligament hinge for the pivot or by dispensing altogether with the pivot and providing limited play by means of a spring connection between the pick-up head C and the adjustable rod B or casing E. Such arrangement is shown in Figures 4 and 5.

In this arrangement the adjustable rod B is provided at its lower end with a cross-bar B⁴, extending along the length of the framework A, and the pick-up head C is suspended from this cross-bar by means of a pair of flat links J connected to the cross-bar and to the head by flat ligament spring J¹, the arrangement constituting a parallelogram linkage constraining the pick-up head C to move substantially in the desired straight line path within the limits of the very short traversing movement required. Since the ligaments J¹ and links J are substantially rigid in the direction of their length, it is desirable to provide some free play between the nut B¹ and the rod B, in conjunction with a spring B⁵.

The casing E containing the mechanism for driving the pick-up head C, is attached to the crossbar B⁴ between the links J, and in the example shown a modified form of driving mechanism is illustrated. In this case, the drive is obtained from a small electric motor within the casing E, this motor driving a heart-shaped cam K, with which a roller K¹ carried by the pick-up head engages, the ligament springs J¹ serving to hold the roller K¹ in engagement with the cam K. Thus as the motor rotates the pick-up head C is driven forwards and backwards through its traversing drive and its return stroke.

Figure 4 also serves to show diagrammatically the electrical leads to the parts within the framework, these leads being taken out through the rod B, which is made hollow for the purpose. Thus the leads L from the piezo-electric crystal or other detector device in the pick-up head C pass through the rod B to the apparatus diagrammatically indicated at L¹ comprising the indicating instrument and the amplifier and other parts of the electrical system for conveying the electrical energy from the detector device to such instrument. The leads M from the shunt-wound electric motor in the casing E are likewise taken out through the rod B to the D. C. source M¹ supplying the motor. In the example illustrated the circuits are such as to permit the motor to be driven at will at either of the two different speeds, so that the unit can be employed in conjunction with an "average" meter and a pen-recorder, in a manner analogous to that described in the prior specification above mentioned. Thus a resistance M² is connected across the source M¹ and a switch M³ is provided to enable the armature winding of the motor to be connected, as desired, either across the whole of the resistance M² or across only a part of such resistance.

In the foregoing arrangements the vertical movement of the adjustable rod B, to bring the pick-up head C into the correct position relatively to the test surface, is controlled by a hand-operated knurled nut. If desired, however, the necessary adjustment can be effected automatically by means of a spring. Figure 6 shows a modification of the arrangement of Figures 4 and 5 to give such automatic adjustment. In this modification the actuating nut B¹ is omitted, and a spring B⁶ is inserted between the upper end of the rod B and the closed upper end of the framework boss A² extended upwardly for the purpose. In this case, it is sometimes preferable to provide a counter weight B⁷ driven through a rack and pinion connection B⁸ from the rod B, thereby ensuring that the working pressure of the skid is determined by the spring B⁶ independently of gravity.

Figures 7 and 8 show a further alternative employing similar automatic adjustment of the bar B by means of the springs B⁵, but in this case as applied to a pick-up head pivoted to a lever F as in Figure 3. In the example shown, the lever F is illustrated by way of variant as carrying a roller K¹ driven by a heart-shaped cam K, as in Figures 4 and 5, instead of by the driving rod G of Figure 3. In order to provide proper control for the spring adjustment, the lever F is provided with a foot F², which slides or rolls on the test surface, the height of the foot being correlated with the skids D¹D² to ensure proper positioning of the pick-up head C on the surface. This foot may be provided on the head C, instead of on the lever F, if desired.

It will be appreciated that the foregoing arrangements have been described by way of example only and that the invention may be carried into practice in other ways. Thus although it has been assumed in the above description that the traversing line on the test surface lies horizontally, this is not essential to the invention, and the surface may lie at any desired angle, the framework being held in engagement with it by hand pressure.

What I claim as my invention and desire to secure by Letters Patent is:

1. A pick-up unit for use in apparatus for measuring or indicating roughnesses or undulations of a cylindrical surface, comprising a light supporting framework having widely spaced supporting elements adapted to be held in engagement with the test surface at points lying on two straight lines parallel to the axis of such surface, a member adjustably mounted in the framework, means for adjusting such member in a direction approximately normal to the test surface, a pick-up head supported with a limited amount of play by the adjustable member, a stylus carried by the pick-up head for traversing over the test surface along a generator thereof, and means carried by the pick-up head affording a datum for the measuring movements of the stylus approximately normal to the test surface during traversing.

2. A pick-up unit as claimed in claim 1, in which means are provided for pivotally connecting the pick-up head to the adjustable member at a point remote from the stylus.

3. A pick-up unit as claimed in claim 1, in which means are provided for resiliently supporting the pick-up head on the adjustable member.

4. A pick-up unit as claimed in claim 1, in which the pick-up head is connected to the adjustable member by means of flat ligament springs arranged to constitute a parallelogram linkage.

5. A pick-up unit for use in apparatus for measuring or indicating roughnesses or undulations of a surface, comprising a pick-up head, a stylus carried by said head adapted to traverse over the surface to be tested, means carried by said head affording a datum for the measuring movements of the stylus, a light supporting framework for said pick-up head having widely spaced supporting elements adapted to be held in engagement with the surface to be tested, and means for adjusting the pick-up head relatively to the said supporting elements in a direction substantially parallel to the working movements of the stylus, said elements being so disposed that, when they are held in engagement with a cylindrical surface, the measuring movements of the stylus in all positions of adjustment of the pick-up head will be constrained to take place along a line which approximately intersects the axis of such cylindrical surface.

6. The combination with the features set forth in claim 5, of means supported by the framework for driving the pick-up head relatively to the framework whereby the stylus is caused to be traversed over the test surface.

7. A pick-up unit for use in apparatus for measuring or indicating roughnesses or undulations of a cylindrical surface, comprising a light supporting framework having widely spaced supporting elements adapted to be held in engagement with the test surface at points lying on two straight lines parallel to the axis of such surface, a member adjustably mounted to the framework, means for adjusting such member in a direction approximately normal to the test surface, a pick-up head supported with a limited amount of play, by the adjustable member, a stylus carried by the pick-up head, means for driving the pick-up head relatively to the framework whereby the stylus is caused to be traversed over the test surface along a generator thereof, and a casing carried by the adjustable member for housing such driving means.

8. A pick-up unit as claimed in claim 7, in which the means for driving the pick-up head relatively to the framework includes an escapement mechanism housed within the casing.

9. A pick-up unit as claimed in claim 7, in which the means for driving the pick-up head relatively to the framework comprises an electric motor housed within the casing.

10. A pick-up unit as claimed in claim 7, in which the means for driving the pick-up head relatively to the framework comprises an electric motor housed within the casing, and a device for controlling the speed of the motor whereby the stylus can be traversed over the test surface at any one of a plurality of different speeds.

11. A pick-up unit as claimed in claim 7, in which the pick-up head is connected to the adjustable member by means of flat ligaments arranged to constitute a parallelogram linkage.

12. A pick-up unit as claimed in claim 1, in which the pick-up head is connected to the adjustable member by means of flat ligament springs arranged to constitute a parallelogram linkage, and the adjusting means includes a spring acting to urge the adjustable member towards the test surface relatively to the framework.

13. A pick-up unit as claimed in claim 7, wherein the pick-up head-driving means is a variable speed mechanism, whereby traverse of the stylus is at a selected one of a plurality of different speeds.

14. A pick-up unit as claimed in claim 1, including automatic actuating means operating the adjusting means to urge said adjustable member toward the surface to be tested.

15. A pick-up unit as claimed in claim 7, including automatic actuating means operating the adjusting means to urge said adjustable member toward the surface to be tested.

RICHARD EDMUND REASON.